US011599932B2

(12) United States Patent
Chomley et al.

(10) Patent No.: US 11,599,932 B2
(45) Date of Patent: Mar. 7, 2023

(54) SYSTEM AND METHODS FOR SHOPPING IN A PHYSICAL STORE

(71) Applicant: IMAGR Limited, Auckland (NZ)

(72) Inventors: William Chomley, Auckland (NZ); Peter Szoldan, Budapest (HU)

(73) Assignee: IMAGR HOLDINGS LIMITED, Auckland (NZ)

( * ) Notice: Subject to any disclaimer, the term of this patent is extended or adjusted under 35 U.S.C. 154(b) by 342 days.

(21) Appl. No.: 17/029,425

(22) Filed: Sep. 23, 2020

(65) Prior Publication Data
US 2021/0042816 A1 Feb. 11, 2021

Related U.S. Application Data

(63) Continuation of application No. 16/078,978, filed as application No. PCT/NZ2017/050015 on Feb. 16, 2017, now Pat. No. 10,832,311.

(30) Foreign Application Priority Data

Feb. 26, 2016 (NZ) .................... 2016900710

(51) Int. Cl.
G06Q 30/00 (2012.01)
G06Q 30/0601 (2023.01)
(Continued)

(52) U.S. Cl.
CPC ........... G06Q 30/0635 (2013.01); B62B 3/14 (2013.01); G06K 9/6271 (2013.01); G06Q 20/14 (2013.01);
(Continued)

(58) Field of Classification Search
CPC .... G06Q 30/0635; G06Q 30/02; G06Q 30/04; G06Q 20/14; G06Q 20/4014; B62B 3/14;
(Continued)

(56) References Cited

U.S. PATENT DOCUMENTS

2002/0170961 A1* 11/2002 Dickson ................. G06Q 30/02
235/383
2005/0185835 A1 8/2005 Matsugu et al.
(Continued)

FOREIGN PATENT DOCUMENTS

GB 2522291 A 7/2015
JP 2014235530 A 12/2014
(Continued)

OTHER PUBLICATIONS

Black, Darren, Nils Jakob Clemmensen, and Mikael B. Skov. "Supporting the supermarket shopping experience through a context-aware shopping trolley." Proceedings of the 21st Annual Conference of the Australian Computer-Human Interaction Special Interest Group: Design: Open 24/7. (Year: 2009).*

(Continued)

Primary Examiner — Matthew E Zimmerman
(74) Attorney, Agent, or Firm — Banner & Witcoff, Ltd.

(57) ABSTRACT

A method and system for assisting in shopping at a physical store (104) is described. The method includes receiving image data of the inside of a shopping cart (108) and processing the image data to detect one or more events. An event is the addition of an item (114) to the shopping cart (108) or the removal of an item (114) from the shopping cart (108). Responsive to detecting an event, the method processes the image data to identify an item associated with the event, and generates cart information based on the identified item. The cart information includes a record of items currently in the shopping cart (108). The method also communicates the cart information with respect to the identified item to a customer device (118).

18 Claims, 7 Drawing Sheets

(51) Int. Cl.
*B62B 3/14* (2006.01)
*G06Q 30/02* (2023.01)
*G06K 9/62* (2022.01)
*G06V 10/44* (2022.01)
*G06V 20/00* (2022.01)
*G06V 30/194* (2022.01)
*G06Q 20/14* (2012.01)
*G06Q 20/40* (2012.01)
*G06Q 30/04* (2012.01)

(52) U.S. Cl.
CPC ......... *G06Q 20/4014* (2013.01); *G06Q 30/02* (2013.01); *G06Q 30/04* (2013.01); *G06V 10/454* (2022.01); *G06V 20/00* (2022.01); *G06V 30/194* (2022.01)

(58) Field of Classification Search
CPC ............. G06K 9/00624; G06K 9/4628; G06K 9/6271; G06K 9/66
See application file for complete search history.

(56) References Cited

U.S. PATENT DOCUMENTS

2009/0307091 A1* 12/2009 Lilley ................ G06Q 30/0224
  705/14.58
2015/0006319 A1* 1/2015 Thomas ............. G06Q 30/0633
  705/26.8
2015/0095189 A1* 4/2015 Dharssi .................. G06V 10/56
  705/26.8
2015/0127496 A1* 5/2015 Marathe ............... G06Q 10/087
  705/28

FOREIGN PATENT DOCUMENTS

| KR | 20150059377 A | 6/2015 |
| WO | 2006102183 A2 | 9/2006 |
| WO | 2013134865 A1 | 9/2013 |

OTHER PUBLICATIONS

May 16, 2017—International Search Report and Written Opinion of PCT/NZ2017/050015.
Schroff, Florian et al., "FaceNet: A Unified Embedding for Face Recognition and Clustering" Proceedings aof the IEEE Computer Society COnference on Computer Vision and Pattern Recognition 2015.
Sep. 20, 2019—ESR—App No. 17756900.

* cited by examiner

SYSTEM AND METHODS FOR SHOPPING IN A PHYSICAL STORE

CROSS-REFERENCE TO RELATED APPLICATIONS

This application is a continuation of U.S. patent application Ser. No. 16/078,978, filed Aug. 22, 2018, entitled "Method And Medium For Shopping In A Physical Store," which claims priority to U.S. National Stage application under 35 U.S.C. § 371 of International Application No. PCT/NZ2017/050015, filed Feb. 16, 2017, all of which are herein incorporated by reference in their entirety.

TECHNICAL FIELD

Aspects of the present disclosure relate to systems and methods for assisting a customer with shopping in a physical store.

BACKGROUND

Typically, when a customer enters a store to purchase items, the customer secures a shopping cart and proceeds to peruse items in the store. As the customer advances through the store, items the customer intends to purchase are added to the cart. Once all items are collected, the customer proceeds to a Point of Sale (POS) counter. Typically, at the counter, the collected items are scanned, a bill for the items is generated, and the items are put into bags/boxes. The customer then pays the bill, collects the items, and exits the store.

This checkout process can often be cumbersome, time consuming, and frustrating for customers, especially at busy times when not only do customers have to endure a slow and cumbersome checkout process, but also wait in long queues before the checkout process even starts. Furthermore, stores may find this process to be expensive, as they have to hire dedicated clerks to perform or monitor the checkout process.

In an attempt to reduce delays and save costs, some stores, such as certain supermarkets, have installed self-service POS counters where customers can perform the checkout functions themselves. However, self-service counters are also limited in number, can often be difficult to operate, and require some level of employee supervision. Furthermore, even if a store manages to reduce delays associated with waiting in queues, the time taken to perform the checkout process is unavoidable.

Accordingly, there exists a need for a system or method that assists customers with shopping in physical stores.

SUMMARY OF THE INVENTION

According to a first aspect of the present disclosure, there is provided a method for assisting in shopping at a physical store. The method includes receiving image data of the inside of a shopping cart and processing the image data to detect one or more events. An event is the addition of an item to the shopping cart or the removal of an item from the shopping cart. Responsive to detecting an event, the method includes processing the image data to identify an item associated with the event, generating cart information based on the identified item, and communicating the cart information with respect to the identified item to a customer device. The cart information includes a record of items currently in the shopping cart.

According to a second aspect of the present disclosure, a shopping support system is provided for assisting in shopping at a physical store. The shopping support system includes a cart system mechanically coupled to a shopping cart at the physical store. The cart system is configured to capture footage of the inside of the shopping cart during a shopping session. The shopping support system further includes a backend system communicatively coupled to the cart system to receive image data. The backend system includes a computer processing unit and a computer readable memory in communication with the computer processing unit. The computer readable memory includes an event detector module executable by the computer processing unit to process the image data to detect one or more events. An event is the addition of an item to the shopping cart or the removal of an item from the shopping cart. The computer readable memory further includes an item identifier module executable by the computer processing unit to process the image data to identify an item associated with an event, responsive to detecting the event. The computer readable memory also includes a payment module executable by the computer processing unit to: generate cart information based on the identified item, and communicate the cart information with respect to the identified item to a customer device. The cart information includes a record of items currently in the shopping cart.

According to a third aspect, a computer processing system is provided for assisting in shopping at a physical store. The computer processing system includes a computer processing unit and a computer readable memory in communication with the computer processing unit. The computer readable memory includes instructions executable by the computer processing unit to cause the computer processing system to: receive image data of the inside of a shopping cart; process the image data to detect one or mom events, an event being the addition of an item to the shopping cart or the removal of an item from the shopping cart; responsive to detecting an event: process the image data to identify an item associated with the event; generate cart information based on the identified item, the cart information including a record of items currently in the shopping cart; and communicate the cart information with respect to the identified item to a customer device.

Further aspects or the present invention and further embodiments of the aspects described in the preceding paragraphs will become apparent from the following description, given by way of example and with reference to the accompanying drawings.

Figure 1:
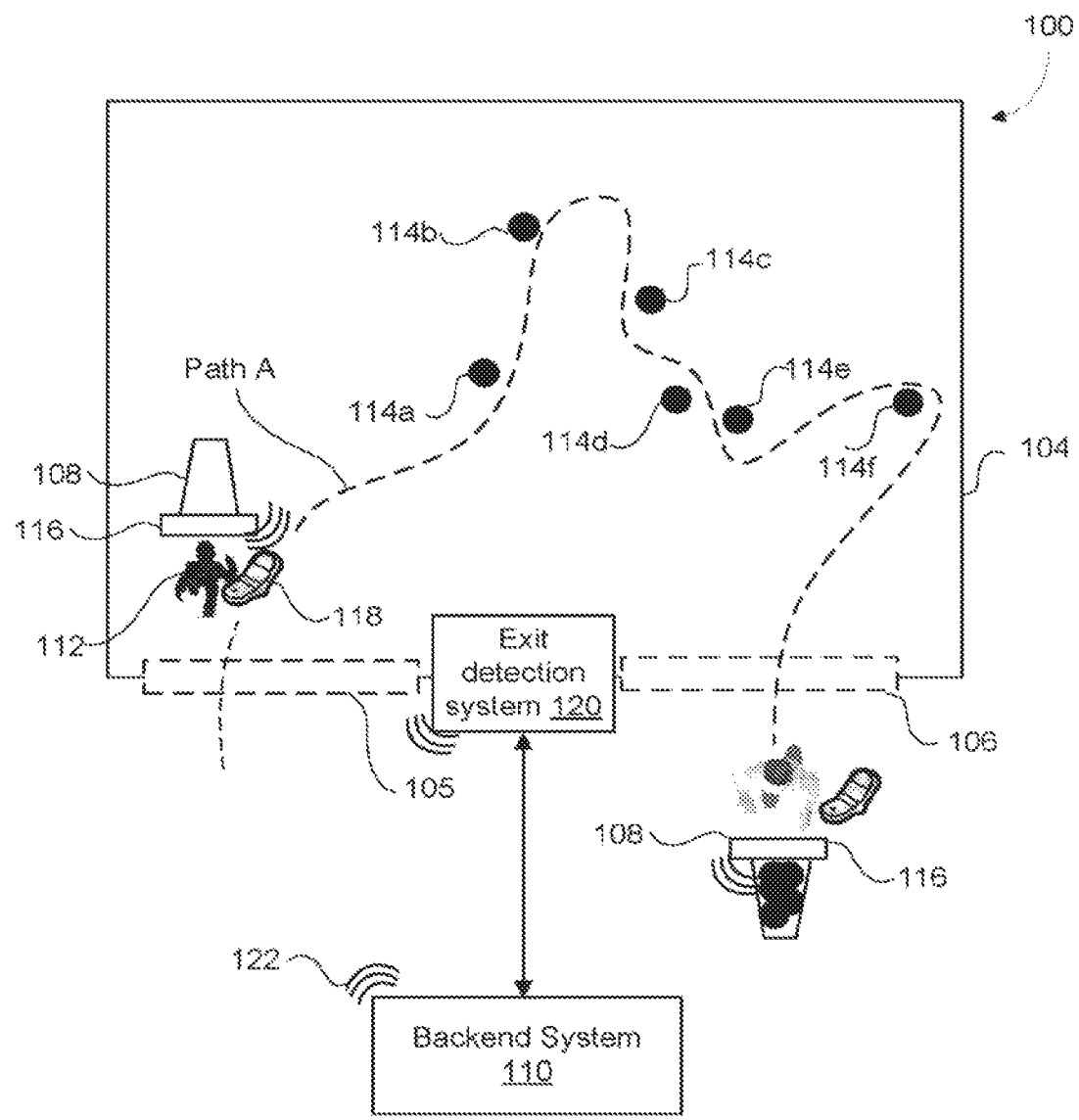
FIG. 1 illustrates a shopping support system implemented in a physical store.

While the invention is amenable to various modifications and alternative forms, specific embodiments are shown by way of example in the drawings and are described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

General Overview

Aspects of the present disclosure are directed to systems and methods for assisting shoppers in physical stores. To that end, aspects of the present disclosure utilize a shopping support system that includes cart systems in communication with a backend system. Each cart system is associated with a shopping cart.

During shopping, a customer adds and removes items from the shopping cart. As this is done, the cart system captures footage of the cart and sends it to the backend system. The backend system, in turn, processes the footage to identify the specific items added to or removed from the cart, records the items to keep an up-to-date listing of the items in the cart, and sends updated cart and/or item information to a device associated with the customer.

On completion of shopping, the shopping support system detects when the customer exits (or is about to exit) the store and facilitates payment for the items. As the items have already been identified and recorded, this "checkout process" does not require the items to be scanned/otherwise entered at a counter/checkout station.

Exemplary Environment

FIG. 1 illustrates an environment 100 in which a shopping support system as described herein can be implemented. Specifically, FIG. 1 illustrates a physical store 104 selling items/products 114. The store 104 may be, for example, a supermarket, a hardware store, a warehouse, a clothing store, a shoe store, a furniture store, a cafeteria, or any other type of store.

The store 104 supplies shopping carts 108 for customers to place items in as they shop. The shopping cart 108 may be a trolley, hand-held basket or any other appropriate receptacle in which the customer 112 can place products. Each cart 108 (or, at least, a selection of the carts 108 made available to customers) is equipped with a cart system 116.

The store 104 may have an entrance area 105 and an exit area 106 through which customers 112 may enter and exit the store. It will be appreciated that some stores may have dedicated and independent entry and exits whereas other stores may utilize the same area for entry and exit.

The shopping support system includes a backend system 110 that communicates with the cart systems 116 and customer devices 118 (described further below).

A customer 112 enters the store 104 through entry area 105 and obtains a shopping cart 108 fitted with a cart system 116. The customer has a customer device 118, such as a mobile phone or other portable computing device. Once a customer has selected a cart 108, the backend system 110 establishes a shopping session, linking the customer device 118 to the cart system 116 of the cart 108 selected. Thereafter, the customer 112 proceeds through the store 104 selecting items 114 intended for purchase. For example, the customer may traverse the store 104 along path A and add items 114a, 114b, 114c, 114d, 114e, and 114f to the shopping cart 108. Before exiting the store, the customer 112 may decide against purchasing previously selected items and remove those items from their cart 108.

As the customer progresses through the store adding or removing items from the cart 108, the cart system 116 captures image data (still and/or video) of the cart. The image data is communicated to the backend system 110 which processes it, identifies the item 114 that has been added to or removed from the cart 108, updates a record of the items currently stored in the cart 108, and sends updated cart information and/or item information to the customer's device 118. This process is repeated each time an item 114 is placed in and/or removed from the cart 108. When the customer 112 finishes shopping and reaches the exit area 106, this is detected. At this point, the backend system 110 facilitates payment for the items in the cart 108 and ends the shopping session.

The cart systems 116 and backend system 110 communicate with each other over one or more wireless store networks 122. Communications may be by any appropriate communications protocol, for example Wi-Fi. In order to handle the required data communications (and in particular data communications between the cart systems 116 and the backend system 110), a high speed/high capacity network is desirable. As one example, the store network 122 to which the cart systems 116 connect in order to communicate data (including image data) to the backend system 110 may be provided by units such as the Xirrus XR-600 or similar.

The customer devices 118 and backend system 110 also communicate with each other via a wireless network. Customer devices 118 may communicate with the backend system 110 using the same wireless store network 122 used to facilitate cart system 116/backend system 110 communications. Alternatively, customer devices 118 may communicate with the backend system 110 over a separate network, for example an alternative Wi-Fi network, a cellular network (e.g. relying on 3G/4G or other cellular network technologies), or other communications network.

The store 104 is also provided with an exit detection system 120 that is used to detect when a cart 108 enters an exit area 106. Exit detection is used as an indication that the customer using that cart 108 has completed shopping and, as such, payment for the items in the cart 108 should be made. Exit detection is described further below.

In the following sections, individual elements of the shopping support system are described in detail.

Cart System

As described above, the cart system 116 is configured to capture image data and communicate this data to the backend system 110. To that end, in its simplest form, the cart system 116 includes a camera configured to capture image data (still images and/or video) and a network interface configured to communicate the captured data with the backend system 110 to transmit the image data to the backend system 110. The camera and network interface may be separate components or incorporated in a single device, such as a Wi-Fi camera. In one example, the Wi-Fi camera can be the Leopard Imaging wide dynamic range (WDR) serial camera LI-M38_OV2715.

Figure 2:
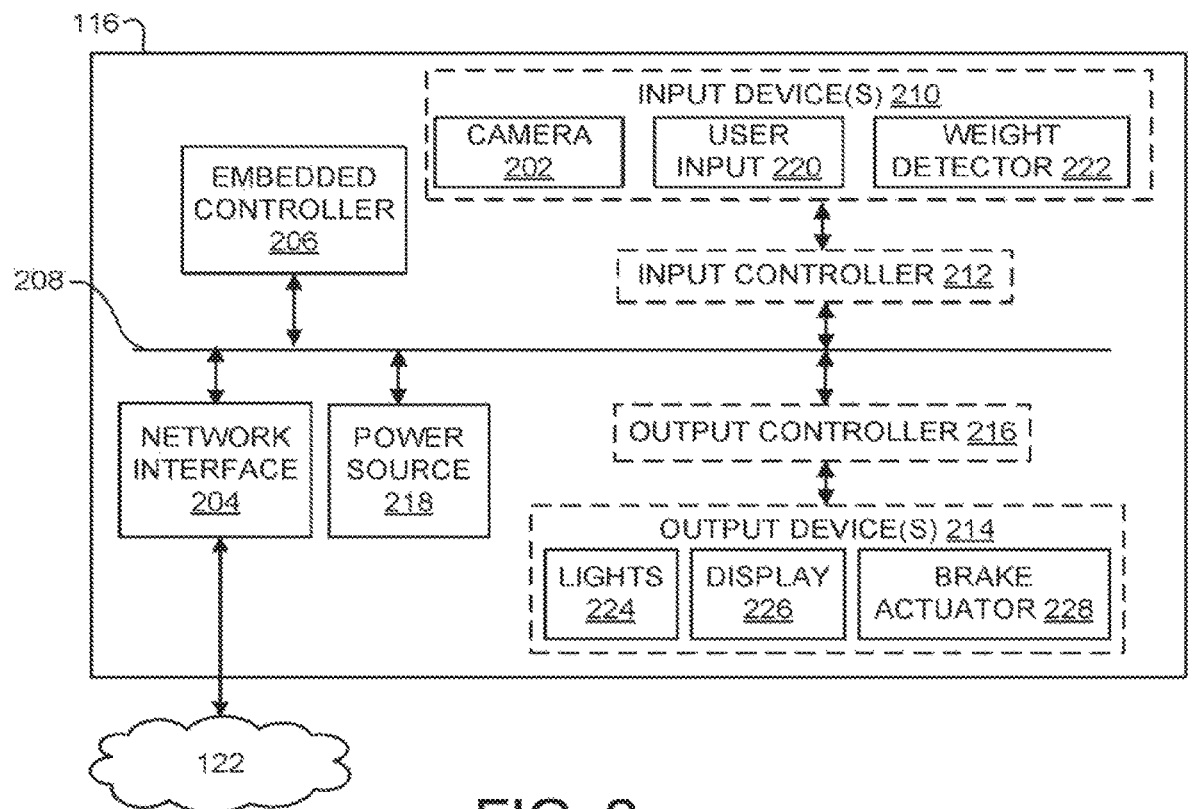
FIG. 2 is a block diagram of a cart system according to aspects of the present disclosure.

FIG. 2 illustrates one example of a cart system 116 in accordance with an embodiment. Cart system 116 includes an embedded controller 206, one or more input devices 210 (controlled by an input controller 212), one or more output device 214 (in communication with an output controller 216), a network interface 204, and a power source 218. These components are interconnected through a system bus 208.

One of the input devices is a camera 202, which is mounted (or configured to be mounted) on the shopping cart 108 such that the portion of the shopping cart where items can be placed is within the camera's viewing range. This can be achieved in various ways. For example, the cart system 116 may be configured so that the camera 202 is affixed to a pole or other support structure that elevates the camera 202 above the cart's interior, thereby providing a full, unobstructed view of the interior of the cart including the cart rim. The support for the camera 202 may be positioned on the cart 108 so that multiple shopping carts can be nested within one another for storage without damaging the cart system 116 (e.g., by mounting the camera 202/cart system 116 to a handle of the cart 108).

Alternatively, the camera 202 may be detachably attached to a rim of the shopping cart 108. In this case, the camera 202 or the entire cart system 116 is detached and stored separately when the shopping cart 108 is not in use and attached to the cart when required.

While the cart system 116 of the described embodiments makes use of a single camera 202, it will be appreciated that more than one camera may be employed to capture images of the shopping cart. For instance, in a two-tier shopping cart, one camera may be utilized for each tier. Alternatively, multiple cameras may be utilised to view different sections of a single compartment of a shopping cart as required.

As different items may have very similar appearances high quality image data is preferred to enable items to be correctly identified by the backend system 110. Accordingly, the camera 202 preferably records high quality images and videos. In one embodiment, the camera generates high dimension images having at least 1080 pixels and a frame rate of 25 frames per second. The high pixel count allows items that fill a fraction of the viewing angle to be properly captured, whereas the high frame rate allows the camera to capture clear and sharp images of moving items, for instance, when customers throw items into the cart 108. In certain embodiments, the camera 202 uses the H.264 format or MPEG-4 Part 10 Advanced Video Coding format to record, compress image data captured by the camera 202 for communication to the backend system 110. It will be appreciated that any other format that can reduce the overall bandwidth required to transmit videos to the backend system 110 may be utilized without departing from the scope of the present disclosure.

In certain embodiments, the cart system 116 includes one or more user input devices 220 such as a keyboard, keypad, touchscreen display, which can be used by customers 112 and/or staff to enter data. For instance, a customer may use the input device 220 to request a particular item's location.

The cart system 116 may further include input devices such as sensors or detectors configured to monitor a property and provide this information to the on board controller 206. For instance, in certain embodiments the cart system 116 includes a weight detector 222 to determine a total weight of the items in the cart (and, from this, the weight increase/decrease that occurs as individual items are added/removed from the cart). The total weight in the cart can be compared with the weight of each identified item to determine whether all items in the cart have been identified correctly. In one aspect, the weight detector 222 may be a weight sensor coupled to the bottom of the cart. Alternatively, the weight detector may be made up of one or more tension meters coupled to vertical wire elements of the cart to measure tension in the vertical wires from the weight of items added to the cart. From the detected tension, the total weight of items in the cart can be calculated.

In certain embodiments, the cart system 116 includes a display 226 to provide information to customers/staff. For example, the display 226 may be used to respond to queries and/or to indicate the status of the cart system 116. The display 226 may be any appropriate device, for example a standalone display, or a touchscreen display (in which case the input device 210 and output device 214 are the same device).

When the cart system 116 is employed in a cart having brakes, the cart system may also include a brake actuator system 228. The brake actuator system 228 may be configured to receive a brake signal from the embedded controller 206 and apply brakes to lock the cart in place. The brake actuator system 228 may be used to prevent a customer from taking a cart out of the store unless payment in respect of that cart has been made. Once payment is successfully made, the brake actuator system 228 may release the brakes, thereby allowing the cart to exit the store.

As one example, the output device(s) 214 may also include one or more lights 224 (such as LED lights) which are controlled to indicate the status of the cart system 116. The lights 224 may include differently coloured lights or a multi-coloured light to indicate different statuses. For instance, a red light may indicate that the cart is unavailable, a green light may indicate that the cart system 116 is successfully linked with the customer device 118 and ready for use, a yellow light may indicate that payment is being processed, and a blue light may indicate an error has occurred in a linking or payment process. Lights having different blinking rates may alternatively be used to convey similar information.

The network interface 204 is used to transmit data to and receive data from the backend system 110. The transmitted data includes image data captured/generated by the camera 202, weight data (where a weight sensor 222 is used), and any query data that may be received from the input controller 212. The received data includes signals to activate or deactivate the camera 202 and/or output information on the output device 214. In order to facilitate communications, the network interface 204 includes a network interface controller (NIC) that allows the cart system 116 to access the network 122 and process low-level network information. For example, the NIC may have a connector for accepting a cable, or an aerial for wireless transmission and reception, and the associated circuitry.

To power the various components of the cart system 116 (e.g. camera 202, network interface 204, and input/output devices 210/214), the cart system 116 includes a power source 218. Example power sources 218 include rechargeable batteries, single use batteries, solar panels, etc.

In FIG. 2, the cart system 116 is depicted as a single block diagram. In some embodiments, the entire cart system 116 may be contained in a single housing. Alternatively, cart system 116 may be distributed, having multiple housings coupled to each other through wires or wirelessly. For instance, the camera 202 may be individually mounted on the rear handle of the cart 108 and the weight detector 222 may be individually mounted on the bottom of the cart. The rest of the hardware may be housed in a separate housing mounted to the rear of the trolley, the bottom of the trolley, etc.

Entry/Exit Detection

To determine when a cart 108 has entered an exit area 106 (and, accordingly, that the customer has completed their shopping), an exit detection system 120 is provided. Detecting that a cart has entered an exit area 106 may be achieved in a variety of ways.

In one embodiment, exit detection is facilitated by a specific wireless network (which will be referred to as an exit network) which is configured to provide coverage at an exit area 106 only. This may involve the placement/provision of shielding at/near an exit area 106 to limit the exit network signal outside the exit area. When the cart system 116 detects the signal of the exit network at above a threshold signal strength level, the cart system determines that it has entered the exit area 106. On this determination, the cart generates and communicates an exit area message to the backend system 110, along with identification information (e.g. a unique cart identifier). The backend system 110 receives the exit communication and commences post-shopping procedure (e.g. facilitating payment for the items recorded to be in the cart).

In an alternative embodiment, the cart system 116 (or cart 108) carries an ID tag that is a passive unique identification tag uniquely identifying each cart system 116 (or cart 108). In this case, the exit detection system 120 includes an exit detector suitable to read the ID tags when in proximity. The exit detector detects an ID tag when in an exit area 106 and, on detection, communicates the identifier of the detected tag (which is, in turn, associated with a particular cart 108/cart system 116) to the backend system.

In this embodiment, any appropriate technology may be used for the ID tags and ID tag reader(s), for example RFD technology, iBeacon technology, NFC technology.

The shopping support system may also include an entry detection system (not shown) to determine if the cart is within the store or within an entrance area 105 of the store 104. Like the exit detection system, the entry detection system may also be facilitated by specific wireless networks or by ID tags. In stores that have a single area that functions as the entrance and exit of the store, the entry and exit detection systems may be combined in a single system that detects presence of the cart in the area covered by the detection system 120. The entry/exit detection systems allow the backend system 110 to track both the entry and exit of carts 108 into and out of the store 104. From this information the backend system 110 can determine whether a given cart 108 is located within the store 104 or not (i.e. if a cart has been recorded as entering but not exiting the store 104 it should be located within the store 104).

Backend System

The backend system 110 performs various operations/For example, and as described further below, the backend system 110 operates to:

a) Manage shopping sessions with customers.
b) Receive image data from the cart system 116.
c) Process the image data to detect item events (i.e. items being added to/removed from the cart 108).
d) Process the image data to identify specific items associated item events.
e) Retrieve item information in respect of identified items.
f) Maintain a record of items currently in a cart 108.
g) Communicate information to customer devices, e.g. information on items that have just been added to/removed from a cart 108.
h) Facilitate payment.

Figure 3:
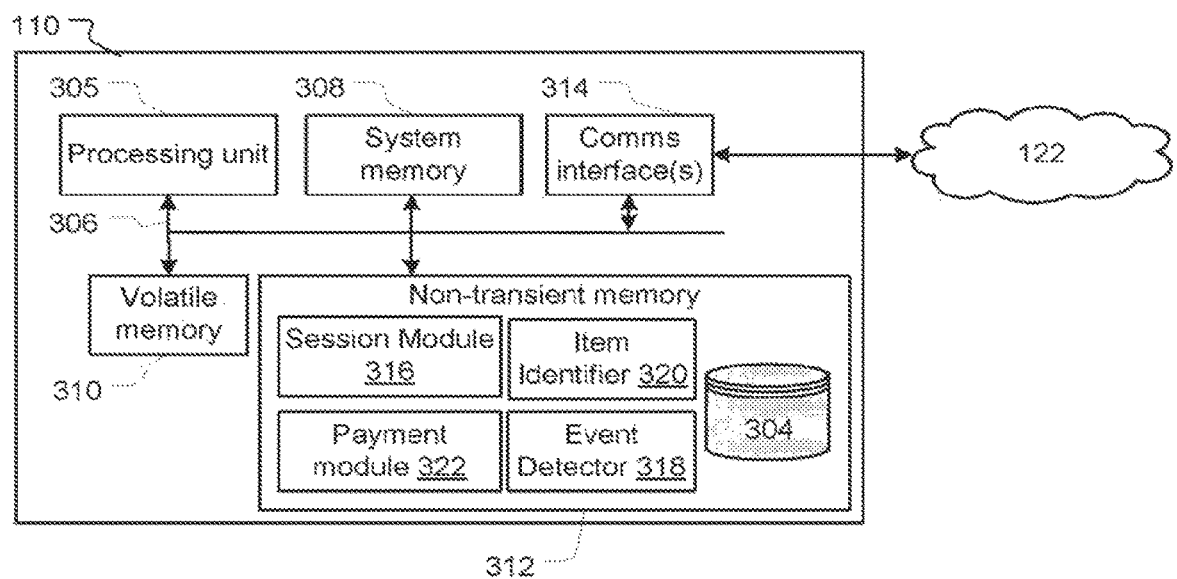
FIG. 3 is a block diagram of a backend system according to aspects of the present disclosure.

The backend system 110 is a computer processing system. FIG. 3 provides one example of a suitable computer processing system that can be used as the backend system 110.

As depicted in FIG. 3, system 110 includes a processing unit 305. Processing unit 305 may include one or more computational processing devices, potentially also including GPU (Graphical Processing Unit) subsystems (aka video cards.)

Through a communication bus 306, the processing unit is in communication with computer readable system memory 308 (e.g. a read only memory storing a BIOS for basic system operations), computer readable volatile memory 310 (e.g. random access memory such as DRAM modules), and computer readable non-transient memory 312 (e.g., one or more hard disk drives). Instructions and data for controlling the processing unit 305 are stored in the memory 308, 310, 312, and 302.

Non-transient memory 312 provides data storage for a database 304 for storing data associated with the programs. For instance, the database 304 may store product information such as stock images of items 114 sold at the store 104, price of items 114, location of items, store inventory, floor plans, and so on. The database 304 may also store user registration details and passwords. Database 304 may alternatively be stored on external computer readable storage accessible by the backend system 110 (via wired, wireless, direct or network connection).

The backend system 110 also includes one or more communication interfaces 314. Communications interfaces 314 are operated to provide wired or wireless connection to the communication network(s) 122. Via the communication interface(s) 314 and network(s) 122, backend system 110 can communicate with other computer systems and electronic devices connected to the network 122. Such systems include, for example, the cart systems 116, the customer devices 210, and (where necessary) entrance/exit detectors. This communication enables the backend system 110 to send control messages, such as activate, and deactivate signals to the cart system 116 and data such as item information and invoices to the customer device 118. This communication also enables the backend system 110 to receive data, such as image data from the cart system 116 and user ID and cart system ID from the customer device 118.

The backend system 110 is configured by executing software. Software, in the form of programs or modules, is stored in non-transient memory 312 and includes computer readable instructions and data. The instructions and data are mad into system memory (e.g. 308) and executed by the processing unit 305 to cause the system 110 to provide the various functions and perform the various operations described herein.

One such module is a session module 316 that is configured to establish a shopping session by linking a particular customer device 118 with a particular cart system 116, establish a temporary cache for the shopping session, transmit a signal for activating the camera 202, and establish a communication between the backend system 110 and the cart system 116. Another such module is an item event detector module 318 that is configured to detect when an item is placed into or removed from a cart 108 based on image data received from the cart system 116 (via the communication interface 314). The memory 312 also includes an item identifier module 320, which is configured to identify added/removed items based on image data associated with an event and record the identified items in the temporary shopping session cache.

In certain embodiments, the backend system 110 is configured to utilize the recorded item data to perform auxiliary functions to assist the customer in their shopping. For instance, the backend system 110 can retrieve information about the identified items from the database 304 and transmit this information to the customer device 120. Additionally, the backend system 110 can generate and update cart information, such as an invoice for the items in the cart, total dietary intake data and/or recipes based on the identified items recorded in the temporary cache.

A payment module 322 is also provided which is configured to process payment for the items in a shopping cart when necessary (e.g., when the cart 108 is detected in the exit area 106). These and other such programs/modules of the backend system 110 will be described in detail with reference to method FIGS. 5 to 10.

It will be appreciated that in some embodiments, one or more modules of the backend system 110 are operated by the store 104, whereas other modules are operated by a third party. For instance, the payment module 322 and the item identifier module 320 may be operated by a third party, whereas the session module 316 and the event detector module 318 may be operated by the store. It will be appreciated that any other combination of modules may be operated by the store or a third party without departing from the scope of the present disclosure.

Alternative system architectures to that described above and illustrated in FIG. 3 are possible. Furthermore, in order to handle the required processing and communication load (and provide redundancy), the backend system 110 may include multiple computer systems (e.g. multiple computer servers) with, for example, a load balancer operating to direct traffic to/from a given computer system of the backend system 110. Alternatively, multiple computer systems may be utilized to perform separate functions of the backend system 110. Some of these systems might be located in the store 104, while others maybe be off-location and in communication with the systems located in the store via the network 122.

Customer Device

Customer devices 118 are, typically, personal computing devices owned by customers. A customer device 118 may, for example, be a mobile phone, a tablet, a watch, or any other portable electronic device capable of communicating with the backend system 110 and displaying information.

A customer's device 118 is linked to a particular cart system 116 for the duration of a shopping session. During a shopping session, the customer device 118 receives information from the backend system 110 regarding items added to/removed from the cart 108 and displays this information to the customer.

Figure 4:
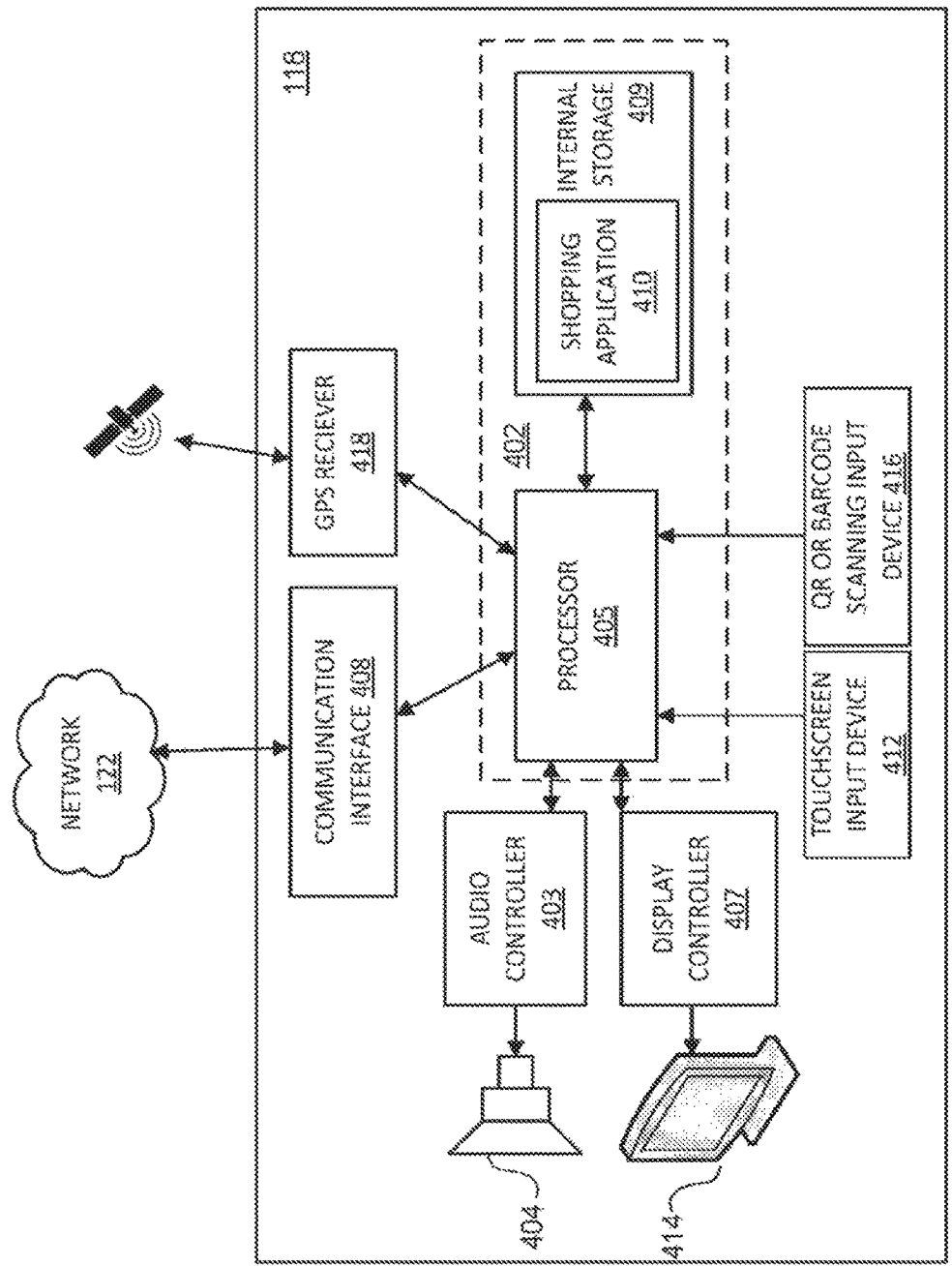
FIG. 4 is a block diagram of a customer device according to aspects of the present disclosure.

One example of a portable electronic device suitable for use as a customer device 118 is shown in FIG. 4. In this example, customer device 118 includes an embedded controller 402, having a processor 405 coupled to an internal storage module 409. A shopping application 410 is installed and stored in the memory 409. When active, the shopping application 410 includes instructions, which are executed to perform various functions. Example functions include:

a) Launching and running a shopping application 410.
b) Capturing or otherwise enabling entry of a cart system identifier (i.e. an identifier that uniquely identifies a particular shopping cart 108/cart system 116).
c) Requesting a shopping session by transmitting cart system ID, user ID and (in certain embodiments) location data.
d) Displaying a user interface with cart information, product information, draft invoices, and final shopping receipts.
e) Saving receipts and transaction history (if requested) in memory.
f) Facilitating payment in association with the payment module 322 of the backend system 110.
g) Allowing users to prepare shopping lists identifying particular items.
h) Displaying the location of items in the store and a route map for collecting the items on a shopping list.
i) Receiving promotional information.

To help perform these functions, the customer device 118 includes a display 414 (e.g. touch screen display, LCD display, LED display, or other display device). The display 414 is configured to display an interface for the shopping application 410 in accordance with instructions received from the embedded controller 402, to which the display is connected. An audio device 404 (e.g. a speaker, headphones, or other audio device) may also be provided, the audio device 404 being configured to output sound in accordance with instructions received from the embedded controller 402.

The customer device 118 also includes one or more user input devices. In some implementations, the user input devices may include a touch sensitive panel physically associated with the display 414 to collectively form a touch-screen 412. The customer device 118 may also include an image capture device 416 (e.g. a camera) or other device capable of reading a QR code and/or barcode. Other user input devices may also be provided, such as a microphone (not illustrated) for voice commands or a joystick/thumb wheel (not illustrated) for easily navigating menus.

The customer device 118 further includes a communication interface 408 that allows the customer device 118 to wirelessly communicate with the backend system 110. Examples of wireless connection include, High Speed Packet Access (HSPA+). 4G Long-Term Evolution (LTE), Mobile WiMAX, Wi-Fi (including protocols based on the IEEE 802.1 family standards), Infrared Data Association (IrDA), Bluetooth®, and the like.

In certain embodiments, the customer device may also include a GPS receiver 418. The GPS receiver 418 receives position signals from positioning satellites to determine the location of the customer device 118. In some aspects, the GPS receiver may be an enhanced GPS receiver that can determine location of the customer device 118 indoors and in zero GPS signal conditions. Moreover, the enhanced GPS receiver can exploit the network 122 to provide complementary, fast, and reliable location sensing when GPS signals are weak or unavailable.

In addition, the customer device may include an inertial measurement unit IMU (not shown) such as an accelerometer or gyroscope, which can be used in combination with the communication interface 408 to accurately and reliably enable the shopping support system to identify in-store location of items and provide location guidance to customers when searching for a particular item in the store. An example indoor positioning system that utilizes Wi-Fi signals and an IMU is the AnyPlace® navigation service by the Data Management Systems Laboratory of University of Cyprus.

System Operation Overview

The operation of the systems described above in order to assist a customer shopping in a physical store will now be described.

Figure 5:
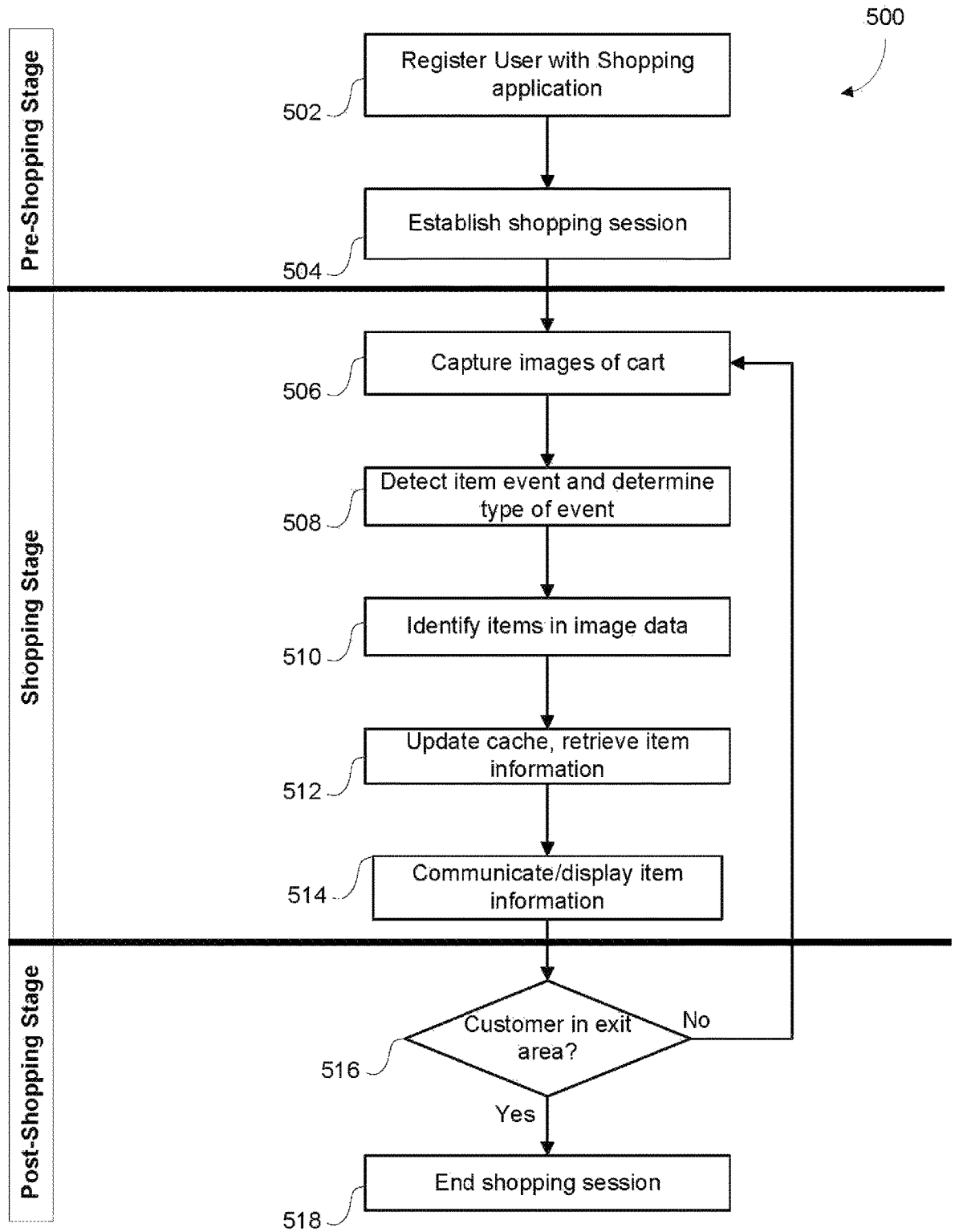
FIG. 5 is a diagram illustrating an overall method for assisting a customer in shopping at a physical store.

FIG. 5 is a diagram illustrating an overall method 500 for assisting a customer in shopping. The method 500 includes three stages—a pre-shopping stage, a shopping stage, and a post shopping stage.

The method 500 begins in the pre-shopping stage at 502, where the customer is registered with the shopping application 410. Customer registration may be achieved in a variety of ways. In certain embodiments, when a customer 112 installs and first accesses the shopping application 410 on the customer device 118 the shopping application prompts the customer 112 to register with the shopping support system. Typically, the customer is requested to provide a user identifier, and personal details such as name, address, contact details, payment details, etc. A password may also be requested for security purposes. Once these details are provided, the customer device 118 transmits them to the backend system 110 via a secure link, where they are stored in the database 304 and an account is created for the customer. Registration may further include an authentication process where, for example, a code is communicated to/received at the customer device 118. If the customer returns the code to the backend system 110, the customer's details am authenticated.

Typically, registration need only be performed once (e.g., when the application 410 is initially installed and opened). Thereafter, the user customer is not required to reregister or login to the application, unless the shopping application 410 is deleted or a new customer device 118 is used.

When the customer enters the store 104, the method proceeds to 504, where a shopping session is established. This process is described in detail below with reference to FIG. 6.

After the shopping session is established, the customer commences shopping. This involves the customer adding items to and removing items from the cart. At 506 (during shopping), the cart system 116 captures image data of the inside of the shopping cart 108 and transmits the image data to the backend system 110. In certain embodiments, the camera 202 begins capturing image data when the shopping session commences and stops capturing image and video data when the cart 108 is detected in the exit area. Where a weight detector is used, the cart system 116 also communicates weight data to the backend system 110 whenever there is a change in the value of the weight data. In some cases, the weight data can be sent with a time stamp.

At 508, the shopping support system detects an item event and determines the type of the event: i.e. that an item is placed in the cart or removed from the cart 108. Event detection is described in detail below.

At 510, the backend system 110 analyses the image data with respect to an item event to identify one or more items associated with the event. The image data associated with a given event is typically the image data from immediately before the event (i.e. immediately before the item is added to or removed from the cart 108) to immediately after the event (i.e. immediately after the item has been added to or removed from the cart 108). Item identification is described in detail below.

If the backend system 110 is unable to identify an item at this step, the backend system generates an error signal and communicates this error signal to the cart system 116 or the portable device 118. On the cart system, the error may be displayed by changing a colour of the lights 224 or by displaying "item not identified" in the display 226. If the error signal is transmitted to the mobile device, an error message may be displayed on the display 414 indicating that an item added to the cart 108 is not identified and requesting the customer to either remove the item or request help from a staff member at the store 104.

In embodiments where a weight detector 222 is used, the backend system 110 also performs a weight checking process to check that the event and item that have been determined are reasonable. This can be achieved in a variety of ways, but generally involves processing the weight data received from the weight detector 222 to determine the sensed/calculated weight of the added/removed item and comparing this with an expected weight of the identified item at that particular time. If there is a mismatch, an error is raised, for example, by notifying the customer or attendant that an item appears to have been incorrectly identified. When timestamps are available, the backend system matches the weight data with the corresponding image data for added accuracy.

By way of example, to determine the weight of the added/removed item, the backend system 110 processes the weight data to calculate a weight change associated with the item event. In certain embodiments, the weight change is determined by subtracting the weight of the cart 108 immediately before the detected event from the weight of the cart 108 immediately after the detected event. In this case, a positive weight change value indicates an item has been added to the cart 108 while a negative weight change value indicates an item has been removed from the cart 108. The calculated weight change value is then compared against an expected weight for the event detected at 508 and the item identified at 510 (the expected weight for the item being retrieved from the relevant database). The event/item is determined to be correct if: the event is an item addition event and the weight change value indicates that an item with approximately (e.g. within a determined threshold of) the expected weight has been added to the cart 108; the event is an item removal event and the weight change value indicates that an item with approximately the expected weight has been removed from the cart 108. Conversely, an error is determined to have occurred if: an item removal event is determined but the weight change indicates an item has been added to the cart 108; an item addition event is determined but the weight change indicates an item has been removed from the cart 108; the value of the weight change is not sufficiently similar to (i.e. is outside a determined threshold of) the expected weight of the item.

Once an item has been identified, the system 110 records the identified item in a temporary cache for the present shopping session together with the event type (i.e. whether the item was added to or removed from the cart 108). The item may also be recorded in another permanent database for further analysis. Information about the identified items is also retrieved from the database 304. In one example, the item information is retrieved by performing a lookup in the database 304. Information may include item price, special discounts on the item, ingredients, dietary information, a stock image of the item, the expected weight of the item, etc.

In some cases, the system 110 is also configured to recommend one or more other items in the same item category to a customer. For example, if the backend system 110 identifies a similar item that is cheaper or healthier than an item added to the customer's cart the system 110 may generate and communicate a recommendation to the customer device to be displayed to the customer. To that end, the system 110 queries the product database and compares the price of the identified item with the price of other similar products in the same category or compares the total energy in the identified item with the total energy in other similar products to recommend a better alternative product. The customer 112 can then swap the identified product with the recommended product, if desired.

At 514, information is communicated to the customer device 118 for display. This information may include certain information regarding the item (e.g. an item name, a stock image of the item, the item price). The information communicated to the customer device 118 may also include updated cart information, for example, the current contents of the cart 108 and/or a draft invoice showing the total cost of items presently in the shopping cart 108. In another example, the cart information includes statistics about shopping cart contents for consumers to understand aggregate consumptions in terms of sugars, energy, gluten, carbohydrates, sugars, dietary fibers, etc. Similarly, the cart information may include one or mom recipes or dish ideas based on the current contents of the cart.

In some aspects, the customer 112 may configure the shopping application 410 to display selected information. For example, the shopping application 410 may be configured to display updated cart information and suppress the product information. In another example, the shopping application may display the draft invoice and substitute product information, but suppress dietary information and ingredient lists.

As the customer 112 continues to shop in the store 104, processes 506 to 514 are repeated each time the customer adds/removes items from the cart 108. Furthermore, the cart information including the draft invoice is updated each time a customer adds or removes an item from the cart. Because of this, the customer can monitor the items that have been placed into/removed from the cart and invoicing in real or near-real time. For example, in certain embodiments the backend system, cart system, and networks are configured such that the delay between a customer putting an item into a cart (or taking an item out of a cart) and the customer's device receiving/displaying information from the backend server is less than 1500 ms. If the customer notices an error in the invoice, for example, because an item has been incorrectly identified or the item price displayed on their device does not reflect the price indicated in-store, the customer can request assistance from a staff member through the shopping application. To that end, the shopping application may include a "request assistance" function. The customer 112 may select this function and feed their location in the application. The shopping application 410 transmits the request to the backend system 110, which in turn notifies the staff in the store 104. Staff members may also be able to rectify errors in the invoice either through the customer's shopping application 410 or through a separate application for staff members.

At 516, the backend system detects that the customer is in an exit area 106. This indicates the customer has finished shopping and the backend system 110 proceeds to the post-shopping stage. At 518, the shopping session has ended. The post-shopping stage is described in detail with reference to FIG. 9.

Establishing a Shopping Session

Figure 6:
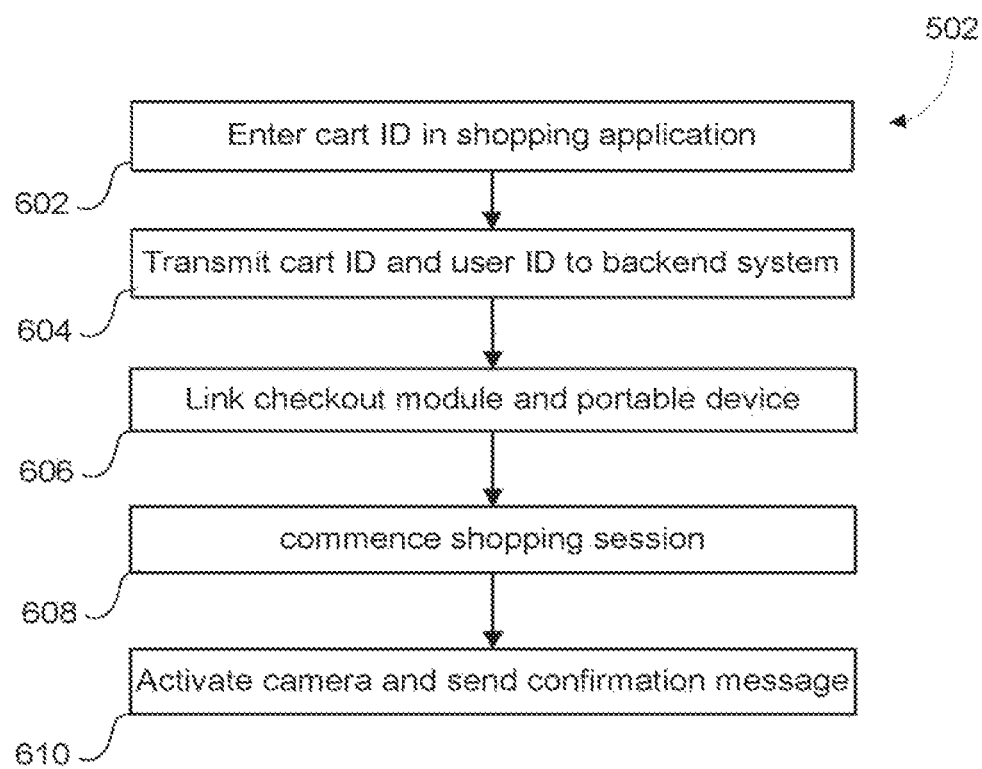
FIG. 6 is a flowchart illustrating a method for linking a can system and a customer device according to aspects of the present disclosure.

Turning to FIG. 6, the pre-shopping process of establishing a shopping session (process 504 of FIG. 5) will be described in mom detail.

Process 502 begins at step 602 when the customer enters the store 104. At this step, the customer requests commencement of a shopping session by capturing or entering a unique ID or code associated with the cart system 116 into the shopping application 410. Various techniques may be utilized to perform this step. In one example, the customer 112 enters the store 104 and selects a shopping cart 108. The cart 108 and/or cart system 116 has a cart identifier displayed (e.g. printed, on a sticker, or otherwise displayed) that uniquely identifies the car 108 or cart system 116. The customer may read this identifier and manually enter it into the shopping application 410 (for example using touchscreen 412). Alternatively, the unique cart identifier may be in the form of a QR code or a barcode, in which case the shopping application 410 prompts the customer to capture the QR code or bar code using the image capture device 416.

At step 604, the shopping application 410 causes the customer device 118 to transmit the cart identifier along with a customer identifier (e.g. a customer user name, a customer device identifier, or the like) to the backend system 110.

At step 606, the backend system 110 links the identified cart system 116 with the customer device 18. This link may be recorded in a simple data structure, for example a table associating cart system identifiers with customer identifiers (which may, in turn, be a customer user name and/or customer device details).

Once the link is established, the method proceeds to step 608, where the session module 316 establishes a shopping session by setting a communication path between the cart system 116 and the backend system 110, and creates a temporary cache in the database 304 for the present shopping session.

The backend system 110 then communicates an activation signal to the cart system 116 and a confirmation message is sent to the customer device 118. Once the cart system 116 is active and the camera 202 is powered on, the cart system 116 may indicate that the shopping cart 108 is ready for use through an output device (if available). For instance, the status may be indicated by switching the colour of the light 224 from red to green or by displaying a 'ready' message on the display.

In some embodiments, the linking process 600 includes security steps to prevent incorrect pairing of a cart 108 with a mobile device 118. For instance, to prevent multiple customers from linking to a particular cart, the backend system 110 determines whether the identified cart system 116 is already active and linked to another customers device. To make this determination, the session module 316 compares the cart system ID with the IDs of cart systems already involved in active shopping sessions. If the session module 316 determines that cart system 116 is already active, an error message is generated and displayed in the shopping application 410. Alternatively, if the cart system is available, the session module 316 proceeds to link the customer device 118 with the cart system 116.

In some cases, a customer may attempt to link their mobile device with a cart system 116 when the person is outside the store, for example in the store's parking lot. Such attempts unnecessarily drain the cart system's power. To prevent such attempts, the backend system 110 may limit the linking process to the entrance area 105 of the store 104. In this case, the backend system 116 obtains data from the entry detector 120 to determine whether the cart 108 is in the entrance area. If the entry detector does not detect the cart 108 in the entrance area, an error message may be displayed, requesting the customer to proceed to the entrance area and retry. If the detector 120 detects the cart in the entrance area 105 and communicates this information to the backend system, the backend system 110 proceeds to link the cart with the mobile device.

In another aspect, to prevent a customer from linking with a cart when they are not in the store, the backend system 110 determines whether the identified shopping cart 108/cart system 116 are within the store 104. In one example, the backend system 110 makes this determination by checking the database 304 to determine whether the exit or entry detector 120 last detected the shopping cart. If the cart was last detected by the exit detector, the backend system concludes that the cart is outside the store. Alternatively, if the cart was last detected by the entry detector, the backend system 110 concludes that the cart is inside the store 104. If the shopping cart is not in the store, the backend system 110 may transmit an error message to the shopping application.

In another example, the shopping support system may determine the location of the cart based on the network the cart system 116 is connected to. If the cart system 116 is connected to the store's network 122, the backend system 110 assumes that the cart 108 is in the store 104. Alternatively, if the cart system 116 is connected to an entry/exit network or not connected any network associated with the store, the shopping support system may assume that the cart 108 is not within the store 104.

Other security steps are also envisioned. For example, the backend system may link the cart with the mobile device only when the cart and mobile device are in the same location. To that end, the backend system 110 requests the customer device 118 to provide location data. The GPS receiver 418 of the customer device 118 determines the location of the customer device and communicates this information to the backend system 110. The backend system 110 then compares this location data with the location of the store that supplies the identified cart system 116. If the customer device's location is at or near substantially similar to the store's location, the cart and mobile device are linked. Else, an error message is displayed. It will be appreciated that the accuracy of the location match depends on the accuracy of the GPS system. For instance, if location information is obtained from the GPS receiver 418, locations about 50-200 meters apart can be considered substantially similar locations. Alternatively, if an enhanced GPS receiver is used, locations about 10-50 meters are considered substantially similar locations. This security measure prevents a user from misusing the shopping support system by linking their customer device 118 to a shopping cart 108 when they are not shopping at the corresponding store 104.

Item Event Detection (Step 508)

An item event occurs when an item is added to or removed from a cart 108. An item event can be one of two types: an item addition event (where an item is added to a cart 108) and an item removal event (where an item is removed from a cart 108).

As described previously, the event detector 318 is configured to continuously monitor footage captured by the camera 202 and detect an item event based on the footage. The event detector 318 is also configured to determine what the item event is.

In one implementation, the event detector compares image data captured at a given time with image data captured at a previous time. If material differences are detected (i.e. differences that are not attributable to noise/unrelated events), the event detector determines that an event is taking place. Further, by comparing images during an item event, the event detector can determine whether an item is being placed in the cart or being removed from the cart. For instance, by processing the image data if the position of an item moves towards the cart from one image to the next, the event detector determines that an item is being added. Alternatively, if the position of the item moves away from the cart from one image to the next, the event detector determines that the item is being removed from the cart. Although this technique requires less computational power, it may lack accuracy because a motion such as a user placing their hand in front of the camera may also be considered an event in this technique.

More accurate results may be achieved by utilizing machine-learning models such as convoluted neural networks (CNN). Convoluted networks include interconnected artificial nodes, called 'neurons' that generally mimic a biological neural network. Typically, the network includes a set of adaptive weights. i.e., numerical parameters that are tuned by training the network to perform certain complex functions. Training a CNN essentially means selecting one model from a set of allowed models that minimizes a cost criterion. There are numerous algorithms available for training neural network models; most of them can be viewed as a straightforward application of optimization theory and statistical estimation.

In the present disclosure, the CNN is trained to detect item events and provide an output for each image fed to the CNN that indicates if an event has occurred or not, and whether the event is an addition event or a removal event.

To be able to detect each of these events, the CNN is trained by first generating an appropriate amount (such as several hundred hours) of camera footage of randomly adding or removing items from the cart 108. Subsequently, the footage is tagged, i.e., each frame of the captured footage is marked as being part of an addition or removal event, or as being 'not relevant'. Next, the tagged data is fed to the CNN, which is trained to estimate the tag (addition/removal event) of an image based on the content of the image. During the training process, an image is fed to the event detector and based on the weights of the networks, an output from the three possible outputs is selected. If the output is incorrect, the CNN changes its weights to be more likely to produce the correct output. This process is repeated numerous times with multiple images, until the CNN can correctly determine the output most of the times. It will be appreciated that the more the process is repeated, the mom accurate the CNN may be.

In addition to detecting an item event, the event detector can also be trained to ignore background noise in images, for example, people's legs in the background as they walk past the cart. To that end, images with background noise are labelled as 'not relevant'. Once the event detector is fed enough number of these images, it is able to calculate the right weights to effectively classify images with background noise as irrelevant images. Training of CNN models is fairly well known in the art and is not described in more detail here.

In other aspects, the event detector can be trained to detect an event based on the camera footage and a difference stream of images. The difference stream includes images of differences between a current image and a previous image. If no change has occurred between the current image and the previous image, the difference image has a zero value. Alternatively, if there are some changes between a current image and a previous image, the difference image has a non-zero value. In addition to training the CNN based on tagged images as described above, the CNN can be trained to detect an event only when a corresponding difference image has a non-zero value. This additional training improves the accuracy of the CNN.

In one embodiment, the CNN model is built based on a TensorFlow® machine learning system, utilizing GoogLeNet's 'Inception' multi-module network and LSTM (Long-Short Term Memory) units used for data stream processing.

Once the event detector has been trained, it is ready for use in the shopping support system. It monitors images and produces an output indicating whether an item event has occurred or not. Once an event is detected, the event detector can forward a portion of the camera footage (for example a 10 s footage around the detected event) to the item identifier for further processing. It will be appreciated that lesser or more number of image frames can be forwarded without departing from the scope of the present disclosure. More number of frames increases the accuracy of the item identifier, but also increases the processing time to recognize an item.

In the embodiments where the event detector is a part of the cart system 116, the network interface 204 transmits selected captured image data associated with the event, for example, a section of image data immediately preceding and after the detected event.

Alternatively, all image data captured by the cart system 116 is communicated to the backend system 110, and the backend system 110 processes the image data to perform event detection.

Each of these approaches has advantages.

For example, where item event detection is performed by the backend system 110, the cart system 116 need not include hardware capable of processing the image data in order to detect an event. Rather, the cart system need only communicate image data without processing it to detect the occurrence of events. Reducing the processing requirements of the cart system 116 may make the cart system 116 less expensive and, accordingly, cheaper to replace if a cart 108 or cart system 116 is stolen/misplaced/damaged.

Alternatively, if item event detection is performed by the cart system 116, the cart system 116 need only communicate a relatively small portion of the captured image data to the backend system 110 for processing. Specifically, instead of communicating all image data to the backend system 110 only image data associated with a detected event needs to be communicated. This reduces the communication overhead/network bandwidth consumed which and, ultimately allows, the network 122 to handle more shopping sessions concurrently.

Item Identification (Step 510)

Item identification may include two sub-steps—masking and item recognition. In masking, the item identifier receives image data corresponding to a detected event from the event detector and generates an image mask for each received image, highlighting the detected item and discarding the remaining image. In item recognition, the product represented by the highlighted portion of the image is identified. Images are masked to prevent the system from re-identifying items previously placed in the cart each time an event is detected. Further, when images are masked, the recognition CNN is required to identify items from relevant data instead of simultaneously trying to identify items and reduce background noise.

Various methods may be used to perform these sub-steps. For instance, an image from the current footage may be compared with an image from the previously received camera footage. Pixel values of the portions of the current image that match the previous image are set to zero. This process is repeated for all the images in the current image set to highlight the added or removed item. For example, if a box of crackers is being placed in the cart, and the item identifier receives 40 image frames of this event, everything except the box of crackers is deleted from the 40 images. For item recognition, the highlighted portion of an image may be compared with stock images of items stored in database 304 to determine the closest match. The closest match is then considered the identified product.

Accuracy in masking and recognizing items can be increased by increasing computational power, for example, by using neural networks for item masking and item recognition. Accordingly, in some aspects, the item identifier includes two CNNs—a masking CNN and recognition CNN. However, before these models can be implemented in a store, the models are trained.

The masking CNN can be trained using the same footage used to train the event detector CNN. Alternatively, different footage may be used. During the training, each image in the footage is tagged as being relevant or not, and item masks are also drawn on every frame that is tagged as relevant. These tagged and masked images are fed to the mask CNN, which is trained to produce a mask on the received images to focus on the items being added/removed and discarding the remaining image.

During method 500, when an event is detected, the event detector communicates image data corresponding to the detected event (for example, a portion of the camera footage, selected images from the detected event, etc.). This image data is fed to the masking CNN, which generates image masks for each image in the image data by highlighting the detected Item and masking the remaining image.

The item recognition CNN is trained based on the tagged and masked footage, and a series of static images of the products sold by the store. In one embodiment, the CNN is trained to learn a Euclidean embedding $f(x)$ for each image x in the footage and in the static images into a feature space $R^d$. The embedding is represented by $f(x) \in R^d$. The network is then trained such that the squared L2 distances in the feature space directly correspond to item similarity: images of the same item have small distances and images of distinct items have larger distances. Once this embedding is done for all the images, item recognition becomes a straightforward k-NN classification problem, i.e., for each image, identify the K nearest neighbours in the Euclidean space.

In one aspect, the images are embedded in 128 dimensions (d). In this case, placement of images in the Euclidean space can be smoothened out by applying secondary normalization to force the points on the surface of a hypersphere (this technically reduces the dimension to 127.)

Further, the embedding can be done based on a triplet loss function. The triplets consist of two matching item images and a non-matching item image. These three images are picked in a way that violates a triplet constraint, i.e., the Euclidean distance between images A and B is greater than between images A and C. The item identifier 320 is then trained to correct this error and embed image A and B close to each other and image C further away from these two images. This training process is repeated until no more, or just very few, images remain.

A method for training the CNN according to the triplet loss method is described in the technical paper 'FaceNet: A Unified Embedding for Face Recognition and Clustering'. Although this paper describes the technique for recognizing faces, it can be adapted to recognise products as well.

Once the recognition CNN is thus trained, it can recognize items displayed in image masks by determining the nearest K neighbours of the image masks. To that end, when the trained recognition CNN receives a set of masked images, the item identifier generates a list of likely items including their probability of a match by calculating the Euclidean distance of the selected image mask from other embedded images in the space. The item with the highest probability of a match is identified as the item added to/removed from the cart.

One advantage of utilizing Euclidean embedding is that the item recognition CNN does not have to be retrained every time a store adds new products. Instead, stock images of the new products are embedded in the Euclidean space using the triplet loss method and when a customer places a new product in the cart, the event detector detects that a customer has placed the item, and communicates images corresponding to this event to the item identifier. The item identifier in turn generates a mask and correctly determines that the item in the image corresponds to a new product because the Euclidean distance of the masked image is closest to the Euclidean location of the embedded new product.

Where a weight sensor 222 is used, the expected weight of the item with the highest probability match (retrieved from an item database) can be compared with the calculated weight increase/decrease of the cart 108 during the event. This provides a further check that the correct item has been identified.

It will be understood that one example technique for training a CNN to recognize items is disclosed here. However, it will be appreciated that other known image recognition techniques, such as embedding images in a random order, may be utilized without departing from the scope of the present disclosure as long as they sufficiently accurately identify items in the images.

Figure 7:
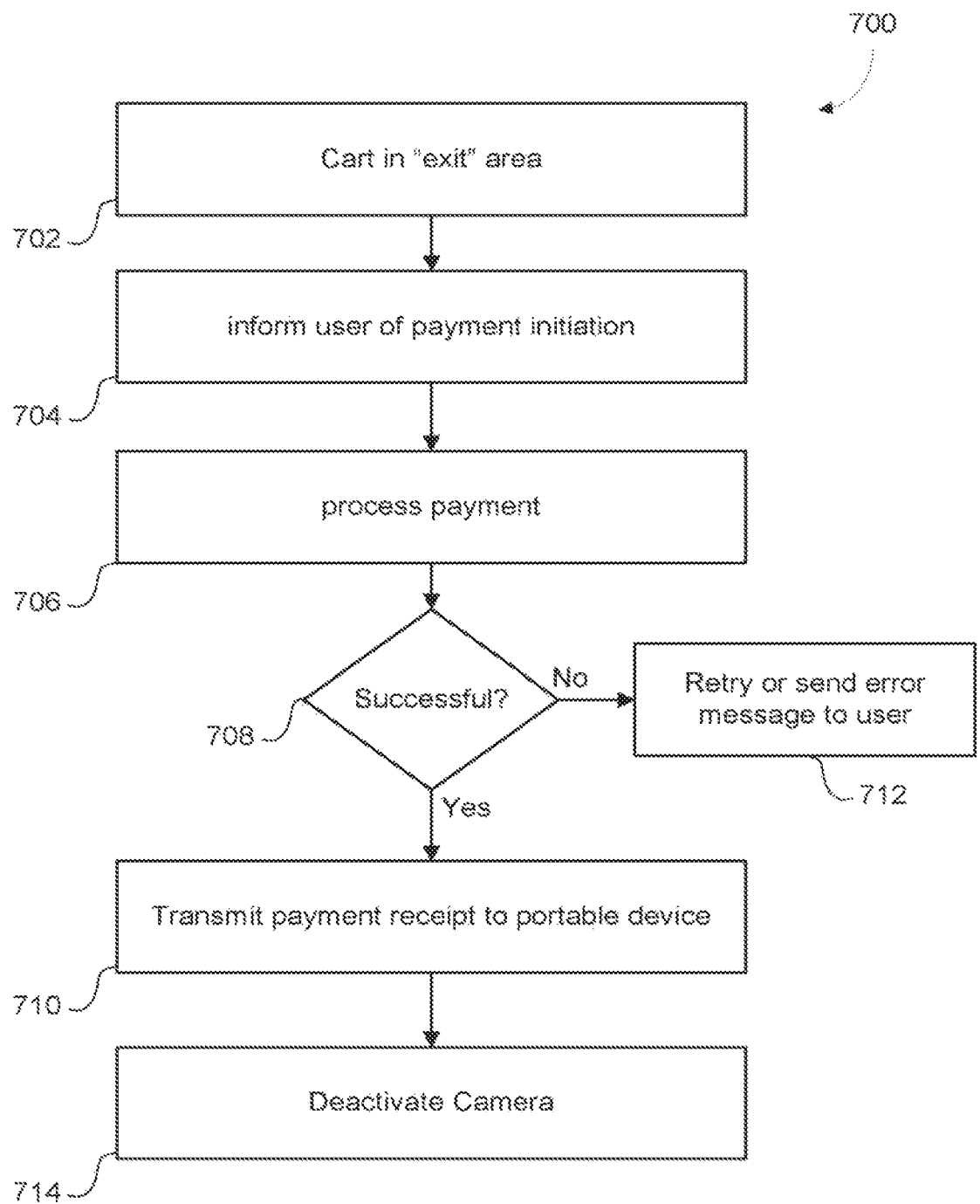
FIG. 7 is a flowchart illustrating a method for completing a shopping session.

It will also be appreciated that the item identifier of the embodiment described above does not rely on barcodes or the like printed on items to identify them, but on more general image data with respect to the items. This allows a customer to place an item into the cart in virtually any manner without having to ensure that a barcode (or similar) is captured by a scanner/camera Post-Shopping Processing FIG. 7 is a flowchart illustrating the post-shopping stage in detail.

The method begins at step 702, where the backend system 110 detects or is notified that that the shopping cart 108 is in an exit area 106. As described above, this may be achieved in a variety of ways, for example by the cart system detecting an exit network and communicating this fact to the backend system 110, or an exit detector detecting a cart ID tag 224 and communicating details of the detected ID tag 224 to the backend system 110.

If the cart identified to be in the exit area 106 corresponds to a cart involved in an active shopping session, the method continues to step 704, where the payment module 322 transmits a message to the shopping application 410 and/or the cart system 116 informing the customer that a payment process has been initiated. A "payment processing" message may be displayed on the display of the customer device and/or on a display of the cart system 116 (is available). If the cart system 116 includes lights 224, the backend system 110 may transmit signals to change the colour or blinking rate of the lights.

At step 706, the payment module 322 processes payment based on the total invoice amount. Payment may be processed in a variety of ways. In one embodiment, purchase details and customer details are sent to a payment module of the backend system 110, which then accesses pre-registered payment details for the customer and initiates card transaction.

If the payment is successful at step 708, the method continues to step 710 where the payment module 322 generates and transmits a payment invoice to the customer device 118. In some aspects, the invoice may be directly received in the shopping application 410 and stored within the application 410. Alternatively, the backend system 110 may forward the invoice to the customer's email address or cloud storage.

If the payment transaction is unsuccessful, the payment module 322 may retry or notify the user at step 712. In the latter case, the user may be allowed to select an alternate payment option (such as a different credit/debit card, or a PayPal® account, for instance) or simply revert to a traditional cashier. In case the customer is using a shopping cart with brakes, the backend system 110 may communicate a brake signal to the cart system 116, which in turn signals the brake actuator 228 to apply the brakes on the shopping cart. This would prevent the customer from exiting the store 104 with the cart without making a payment. In addition, if the cart system 116 includes lights 224 or display 226, the lights may change colours or blink to indicate the error or the display may be configured to show an 'unsuccessful payment' message.

At step 714, the camera 202 of the cart system is deactivated. In one embodiment the payment module 322 transmits a deactivation signal to the cart system 116 for powering-off the camera 202. The payment module 322 also delinks the cart system 116 from the customer's device/shopping application 410, ends the shopping session, and deletes the temporary shopping session cache.

Additional Functions

As described previously, once an item is identified and the identified item data is recorded in the cache or database, the backend system 110 may be configured to perform various additional functions.

For example, the backend system 110 may be configured to link to and update store inventory in real time based on the registered item data. In this case, when an item is recorded as being added to or removed from a cart 108, the system 100 automatically updates the stores item inventory (which may be maintained in database 304 or an alternative database). In addition, if the number of recorded items falls below a threshold value, the system 110 generates an alert, notifying the store staff to restock that particular item in the store 104 or place an order for that item.

The backend system 110 (or an alternative system using item data captured/identified by the backend system 110) can also be configured to identify purchase patterns based on the recorded item data. For instance, over a period, the system 110 may determine a customer's shopping pattern by identifying the items most frequently placed in a customer's shopping cart 108 and the days on which the customer shops most often. Based on those patterns, the backend system 110 generates and forwards personalized promotions to the customer's shopping application 410. For instance, if a customer buys a particular milk and bread brand every three days, the backend system 110 may send a notification to the customer whenever the price of that particular milk or bread brand is discounted.

Figure 8:
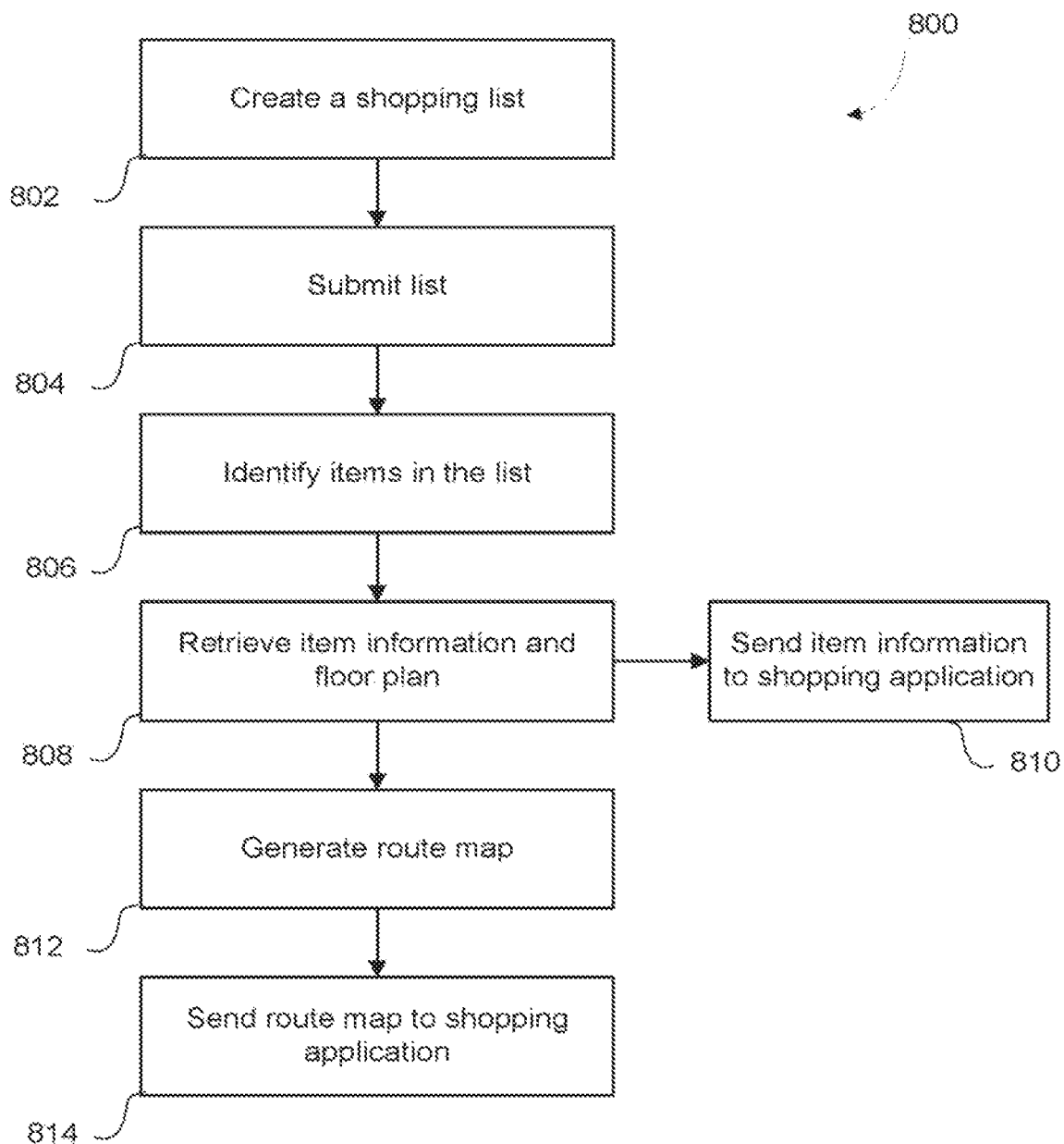
FIG. 8 is a flowchart illustrating a method for enhancing a shopping experience.

In still further embodiments, the shopping support system may be utilized to assist customers in preparing a shopping list and to complete their shopping based on the list. FIG. 8 illustrates an example method for this. The method begins at step 802, where the customer 112 creates a shopping list. To that end, the shopping application 410 includes an input form into which the customer 112 creates the shopping list by typing item names, selecting items from item lists, or adding item images. Once completed, the shopping list is submitted at step 804, which transmits the shopping list to the backend system 110. At the backend, in step 806, the items in the list are identified. If the items were submitted as images, the item identifier 318 identifies the items from the images. At step 808, the backend system 110 retrieves store floor plans and product information, such as price and location information for each identified item in the list from the database 304. This information is subsequently transmitted to the customer device 118 at step 810.

To further improve efficiency, the backend system 110 may generate and provide a shortest path route map to collect all the items on the shopping list to the customer device 118 at steps 812 and 814 based on the floor plans and locations of items in the list. When the shopping session commences, the backend system 110 activates the route map and guides the customer 112 through the store 104 in real time to pick-up items on the user's list. This feature offers two advantages. In addition to saving the customer's time, this feature allows the backend system 110 to predict the items that would be added to the shopping cart next and reduce the time taken to recognize items at the backend system.

As described above, FIGS. 5 to 8 illustrate exemplary methods 500-800 as collections of steps in logical flowcharts. The flowcharts represent sequences of operations that can be implemented in hardware, software, or a combination thereof. When implemented in software, computer readable instructions are stored and executed by a computer processing device to cause the relevant system to perform the described operations. The software instructions may be formed as one or more code modules, each for performing one or more particular tasks. The order in which a given process is described in not necessarily intended to be construed as a limitation. In certain cases, the steps can be performed in a different order to that shown. Further, in certain cases multiple steps can be combined into a single step, a single step can be performed as multiple separate steps, additional steps can be included, and/or described steps can be omitted.

Alternative Embodiments

In the embodiments described above, the customer device 118 is described as a mobile phone or tablet (or other portable device) owned by the customer 112, with the shopping application 410 installed and stored on the customer device. Further, the customer is registered with the shopping application through the customer's device and once registered, the customer does not need to re-register or login each time they visit the store.

In an alternative embodiment, the functions of the customer device 118 may be performed by the cart system 116. In this case, the shopping application 410 is installed on the cart system 116 and the cart system 116 includes a user input device 220 (such as keyboard or keypad) and a display 226. When the customer 112 selects a shopping cart 108, the display of the cart system 116 displays a login page, where the customer can enter their login details such as a user name and password. If the customer is shopping for the first time, the customer first registers with the shopping support system.

Once the customer is registered and authenticated, the shopping session may be established and the camera 22 may be activated without performing steps 602-616 of FIG. 6. Furthermore, because the customer logs into his or her own shopping application 410, the customer can retrieve any shopping lists saved in the shopping application, or view any previous shopping receipts. The other functions of the customer device 118, such as displaying product and cart information can also be performed by the touchscreen display of the cart system 116.

One advantage of this embodiment is that the customer 112 can shop without their customer device. At the same time, however, the cart system 116 is, likely to require more complex (and expensive) hardware, and as such become more expensive to replace if stolen/lost/damaged.

In yet another alternative embodiment, the shopping application may operate to allow the customer device to also perform the functionality of the cart system 116. In this case, the shopping cart 108 is fitted with a dock/mount to removeably secure the customer's device to the cart 108 in a way that the camera of the customer's device has a field of view covering the inside of the cart. If the customer's device is mounted to the cart in such a manner that the entire interior of the cart is not in the viewing range of the camera, the shopping application may generate an error message requesting the customer to correctly dock the customer device. Further, the communication interface of the customer's device can be used to transmit images to the backend system 110, receive camera activation, and deactivation signals from the backend system.

In this embodiment too, the shopping session can be established without performing steps 602-616 of FIG. 6. An advantage of this embodiment is that the initial setup costs are reduced, as the store has to merely install a dock on the shopping cart 108. The replacement costs are also low. However, the shopping support system is limited by the quality of the camera in the customer's device.

In the foregoing specification, embodiments of the present disclosure are described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A computer-implemented method for assisting in shopping at a physical store, the method comprising:
activating a shopping session for a customer, wherein activating the shopping session includes linking the customer to a cart system for a duration of the shopping session, the cart system mechanically coupled to a shopping cart;
during the shopping session:
capturing image data of the inside of a shopping cart;
processing the image data to detect one or more events and, for each event, determining an event type, the event type being an item addition event involving addition of an item to the shopping cart or an item removal event involving removal of the item from the shopping cart;
responsive to detecting an event:
processing the image data to identify an item associated with the event;
retrieving item information with respect to the identified item, the information including at least an item name;
updating cart information based on the identified item, the identified event type and the retrieved item information, the cart information including at least a record of items currently in the shopping cart; and
displaying the updated cart information on a display,
wherein in order to limit unnecessary battery drain, linking the customer to the cart system further includes determining a location of the cart system, and wherein establishing the shopping session is performed at least in part in response to determining that the location of the cart system is within a threshold distance of a location of the physical store.

2. The computer-implemented method of claim 1 wherein linking the customer to the cart system includes receiving information associated with the cart system in a shopping application, the shopping application installed and executing on an electronic device of the customer.

3. The computer-implemented method of claim 1, wherein the information associated with the cart system includes a unique shopping cart identifier or code.

4. The computer-implemented method of claim 1, wherein the information associated with the cart system is a QR code or barcode, and linking the customer to the cart system includes capturing the QR code or bar code with an image capture device of the electronic device.

5. The computer-implemented method of claim 1, wherein the customer has a user account with the shopping application and the user account includes customer information.

6. The computer-implemented method of claim 5, wherein linking the customer to the cart system further includes, the shopping application communicating the information associated with the cart system and the customer information to a backend system and the backend system linking the information associated with the cart system and the customer information for the duration of the shopping session.

7. The computer-implemented method of claim 6, wherein establishing the shopping session further comprises setting a communication path between the cart system and the backend system and creating a temporary cache in a memory associated with the backend system for the established shopping session.

8. The computer-implemented method of claim 1, wherein linking the customer to the cart system further includes determining whether the cart system is already linked to another customer.

9. The computer-implemented method of claim 1 further comprising:
receiving an instruction to generate an invoice; and
generating the invoice based on a state of the cart information at the time of receiving the instruction to generate the invoice.

10. The computer-implemented method of claim 9 further comprising:
processing a payment based on the invoice; and
responsive to completion of the payment, terminating the shopping session.

11. A non-transitory computer-readable medium storing instructions that, when executed by one or more computer processing units, cause a computer processing system to perform operations comprising:
activating a shopping session for a customer, wherein activating the shopping session includes linking the customer to a cart system for a duration of the shopping session, the cart system mechanically coupled to the shopping cart;
during the shopping session:
capturing image data of the inside of a shopping cart;
processing the image data to detect one or more events and, for each event, determining an event type, the event type being an item addition event involving addition of an item to the shopping cart or an item removal event involving removal of the item from the shopping cart;
responsive to detecting an event:
processing the image data to identify an item associated with the event;
retrieving item information with respect to the identified item, the information including at least an item name;
updating cart information based on the identified item, the identified event type and the retrieved item information, the cart information including at least a record of items currently in the shopping cart; and
displaying the updated cart information on a display, wherein in order to limit unnecessary battery drain, linking the customer to the cart system further includes determining a location of the cart system, and wherein establishing the shopping session is performed at least in part in response to determining that the location of the cart system is within a threshold distance of a location of the physical store.

12. The non-transitory computer readable medium of claim 11, wherein the operation of linking the customer to the cart system further includes receiving information associated with the cart system in a shopping application, the shopping application installed and executing on an electronic device of the customer.

13. The non-transitory computer-readable medium of claim 12, wherein the information associated with the cart system includes a unique shopping cart identifier or code.

14. The non-transitory computer-readable medium of claim 12, wherein the information associated with the cart system is a QR code or barcode, and linking the customer to the cart system includes capturing the QR code or bar code with an image capture device of the electronic device.

15. The non-transitory computer-readable medium of claim 12, wherein the customer has a user account with the shopping application, the user account including customer information.

16. The non-transitory computer-readable medium of claim 15, wherein the operation of linking the customer to the cart system further includes the shopping application communicating the information associated with the cart system and the customer information to a backend system and the backend system linking the information associated with the cart system and the customer information for the duration of the shopping session.

17. The non-transitory computer-readable medium of claim 16, wherein the operation of establishing the shopping session further comprises setting a communication path between the cart system and the backend system and creating a temporary cache in a memory associated with the backend system for the established shopping session.

18. The non-transitory computer-readable medium of claim 11, further comprising instructions that when executed by the one or more computer processing units further cause the computer processing system to perform operations comprising:
receiving an instruction to generate an invoice;
generating the invoice based on a state of the cart information at the time of receiving the instruction to generate the invoice;
processing a payment based on the invoice; and
responsive to completion of the payment, terminating the shopping session.

* * * * *